(12) United States Patent
Wensel et al.

(10) Patent No.: US 7,243,959 B2
(45) Date of Patent: Jul. 17, 2007

(54) REACTOR WATER ISOLATION DEVICES

(75) Inventors: Kevin Joseph Wensel, San Jose, CA (US); Scott S. Duink, Los Gatos, CA (US); Mark P. Allison, Willowbrook, IL (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 11/054,197

(22) Filed: Feb. 9, 2005

(65) Prior Publication Data

US 2005/0204535 A1    Sep. 22, 2005

Related U.S. Application Data

(62) Division of application No. 10/064,874, filed on Aug. 26, 2002, now Pat. No. 6,932,117.

(51) Int. Cl.
| | |
|---|---|
| *F16L 25/00* | (2006.01) |
| *F16L 55/00* | (2006.01) |
| *B25B 5/00* | (2006.01) |
| *B25B 1/06* | (2006.01) |

(52) U.S. Cl. ............... 285/420; 285/15; 285/197; 269/143; 269/249; 269/254 CS; 24/523

(58) Field of Classification Search ............ 285/194, 285/195, 197, 420, 15; 269/143, 249, 43, 269/45, 254 CS, 287; 24/523
See application file for complete search history.

(56) References Cited

U.S. PATENT DOCUMENTS

| | | | | |
|---|---|---|---|---|
| 180,781 | A | * | 8/1876 | Morgan ............... 285/334.2 |
| 642,489 | A | * | 1/1900 | Pyke ................... 285/148.23 |
| 1,770,116 | A | * | 7/1930 | Thomas, Jr. ................ 285/195 |
| 2,480,167 | A | * | 8/1949 | Thomas ................... 131/243 |
| 2,602,358 | A | * | 7/1952 | Lile ........................ 72/409.09 |
| 2,711,167 | A | * | 6/1955 | Rickard ....................... 606/201 |
| 2,826,799 | A | | 3/1958 | Schustack |
| 3,218,058 | A | * | 11/1965 | Smith ........................ 269/166 |
| 3,280,846 | A | | 10/1966 | Anderson et al. |
| 3,509,882 | A | * | 5/1970 | Blake ........................ 606/142 |
| 3,603,318 | A | * | 9/1971 | Yurdin ....................... 131/244 |
| 3,741,561 | A | * | 6/1973 | Reidenbach ................ 269/43 |
| 3,925,854 | A | * | 12/1975 | McFadden ................ 29/252 |
| 4,018,246 | A | * | 4/1977 | Langstroth ................ 137/318 |
| 4,111,234 | A | | 9/1978 | Wells et al. |
| 4,391,458 | A | | 7/1983 | Blakeley |
| 4,393,899 | A | | 7/1983 | Tsuji et al. |
| 4,441,749 | A | | 4/1984 | Blaschke et al. |
| 4,535,822 | A | | 8/1985 | Rogers, Jr. |
| 4,584,162 | A | | 4/1986 | Yoli |

(Continued)

*Primary Examiner*—James M. Hewitt
(74) *Attorney, Agent, or Firm*—Armstrong Teasdale LLP

(57) ABSTRACT

A seal clamp assembly for sealing an opening in a piping system includes, in an exemplary embodiment, a base having a first side, a second side and an aperture extending therethrough from the first side to the second side, and a brace coupled to the base. The brace includes a distal pad hingedly coupled to a distal end portion of the brace. The seal clamp assembly also includes a spring bridge coupled to the base first side. The bridge includes a substantially rectangular U-shaped frame and an aperture extending through the spring bridge frame such that the spring bridge aperture is in substantial lineal alignment with the base aperture. A clamping assembly is coupled to a proximate end portion of the brace.

14 Claims, 15 Drawing Sheets

U.S. PATENT DOCUMENTS

| | | |
|---|---|---|
| 4,756,338 A | 7/1988 | Guyatt et al. |
| 4,761,024 A * | 8/1988 | Ewen .......................... 285/93 |
| 4,768,813 A | 9/1988 | Timmons |
| 4,789,189 A | 12/1988 | Robertson |
| 5,022,421 A * | 6/1991 | Johnson .................. 137/15.13 |
| 5,067,696 A * | 11/1991 | Morley ........................ 269/49 |
| 5,161,787 A * | 11/1992 | Hobday ......................... 269/6 |
| 5,402,828 A | 4/1995 | Pino |
| 5,427,364 A * | 6/1995 | Zborschil .................... 269/166 |
| 5,437,489 A | 8/1995 | Sanders et al. |
| 5,577,535 A | 11/1996 | Motta et al. |
| 5,590,913 A | 1/1997 | Morris et al. |
| 5,906,048 A * | 5/1999 | Bender .................... 29/890.14 |
| 6,123,326 A * | 9/2000 | Kleinbongartz ............. 269/215 |
| 6,264,203 B1 * | 7/2001 | Weems et al. .............. 277/314 |
| 2002/0050472 A1 | 5/2002 | McEwen |

\* cited by examiner

REACTOR WATER ISOLATION DEVICES

CROSS REFERENCE TO RELATED APPLICATIONS

This application is a divisional application of U.S. application No. Ser. 10/064,874 filed Aug. 26, 2002 now U.S. Pat. No. 6,932,117.

BACKGROUND OF THE INVENTION

This invention relates generally to nuclear reactors and, more particularly to apparatus for plugging openings or leaks in nuclear plant piping systems for maintenance or repair.

A typical boiling water reactor (BWR) includes a pressure vessel containing a nuclear fuel core immersed in circulating coolant water which removes heat from the nuclear fuel. The water is boiled to generate steam for driving a steam turbine-generator for generating electric power. The steam is then condensed and the water is returned to the pressure vessel in a closed loop system. Piping circuits carry steam to the turbines and carry recirculated water or feed-water back to the pressure vessel that contains the nuclear fuel.

Additional piping circuits perform emergency cooling of the core. Some of these piping systems are high pressure systems, others provide reactor cooling water at relatively lower pressures, still others are designed to supply cooling flow while the reactor is in a shutdown state and the pressure vessel is open. During shutdown conditions maintenance work is performed on reactor plant systems rendering some components inoperable in their normal mode. To accomplish maintenance work during shutdowns, alternate means of isolating piping systems and vents need to be provided. This can be accomplished by lowering the water level in the reactor below a level of the elevation of the equipment desired to be worked on. Depending on the elevation of the equipment, a significant disruption to reactor maintenance activities may be required. The isolation of equipment may require removable of all fuel from the reactor, installation of the reactor pressure vessel head, restriction of access or evacuation of the containment and drywell areas. After completion of the maintenance, the above steps must be reversed prior to returning to normal outage maintenance activities.

BRIEF DESCRIPTION OF THE INVENTION

In one aspect, a seal clamp assembly for sealing an opening in a piping system is provided. The seal clamp assembly includes a base having a first side, a second side and an aperture extending therethrough from the first side to the second side, and a brace coupled to the base. The brace includes a distal pad hingedly coupled to a distal end portion of the brace. The seal clamp assembly also includes a spring bridge coupled to the base first side. The bridge includes a substantially rectangular U-shaped frame and an aperture extending through the spring bridge frame such that the spring bridge aperture is in substantial lineal alignment with the base aperture. A clamping assembly is coupled to a proximate end portion of the brace.

In another aspect, a seal clamp installation tool for remotely attaching a seal clamp assembly to a pipe is provided. The seal clamp assembly includes a collar, and the installation tool includes a first plate having a first face, a second face opposite the first face, and an aperture extending through the first plate from the first face to the second face. The tool also includes a pole adapter extending perpendicularly from and fixedly attached to the first plate first face, a cylinder actuator including a body and a cylinder pole extending perpendicularly from an axial face of the body with the cylinder actuator replacably attached to the first plate first face such that said cylinder pole extends through the first plate aperture. The tool further includes a second plate that includes a first face with the first face fixedly attached to a distal end of the cylinder pole.

In another aspect, a seal clamp assembly is provided. The seal clamp assembly includes a first half-shell having a first semi-cylindrical body, and a second half-shell having a second semi-cylindrical body. The first semi-cylindrical body includes a concave interior surface, a convex exterior surface, a plurality of engagement tabs, and a plurality of seals. The second semi-cylindrical body includes a concave interior surface, a convex exterior surface, and a plurality of actuating cylinders coupled to the exterior face. Each actuating cylinder includes a cylinder extension that includes a shaft and an engagement disc coupled to an axial face of the shaft. The second semi-cylindrical body also includes a plurality of seals.

In another aspect, a method of sealing an opening in a pipe is provided. The method includes providing a seal clamp assembly that includes a base including a first side, a second side and an aperture extending therethrough, and a brace coupled to the base. The brace includes a distal pad hingedly coupled to a distal end portion of the brace. The seal clamp assembly also includes a spring bridge coupled to the base first side and a clamping assembly coupled to a proximate end portion of the brace. The bridge includes a substantially rectangular U-shaped frame and an aperture extending through the spring bridge frame such that the spring bridge aperture is in substantial lineal alignment with the base aperture. The method also includes providing a seal clamp installation tool that includes a first plate including opposing first and second faces and an aperture extending therethrough, a pole adapter extending perpendicularly from and fixedly attached to the first plate first face, a cylinder actuator including a body and a cylinder pole extending perpendicularly from an axial face of the body, the cylinder actuator replacably attached to the first plate first face such that the cylinder pole extends through the first plate aperture, and a second plate includeg a first face, the first face fixedly attached to a distal end of the cylinder pole. The method further includes engaging the seal clamp installation tool to the seal clamp assembly, actuating the seal clamp installation tool cylinder actuator to a retracted position, positioning the seal clamp assembly on the pipe, and actuating the seal clamp installation tool cylinder actuator to an extended position to secure the seal clamp assembly to the pipe.

DETAILED DESCRIPTION OF THE INVENTION

Figure 1:
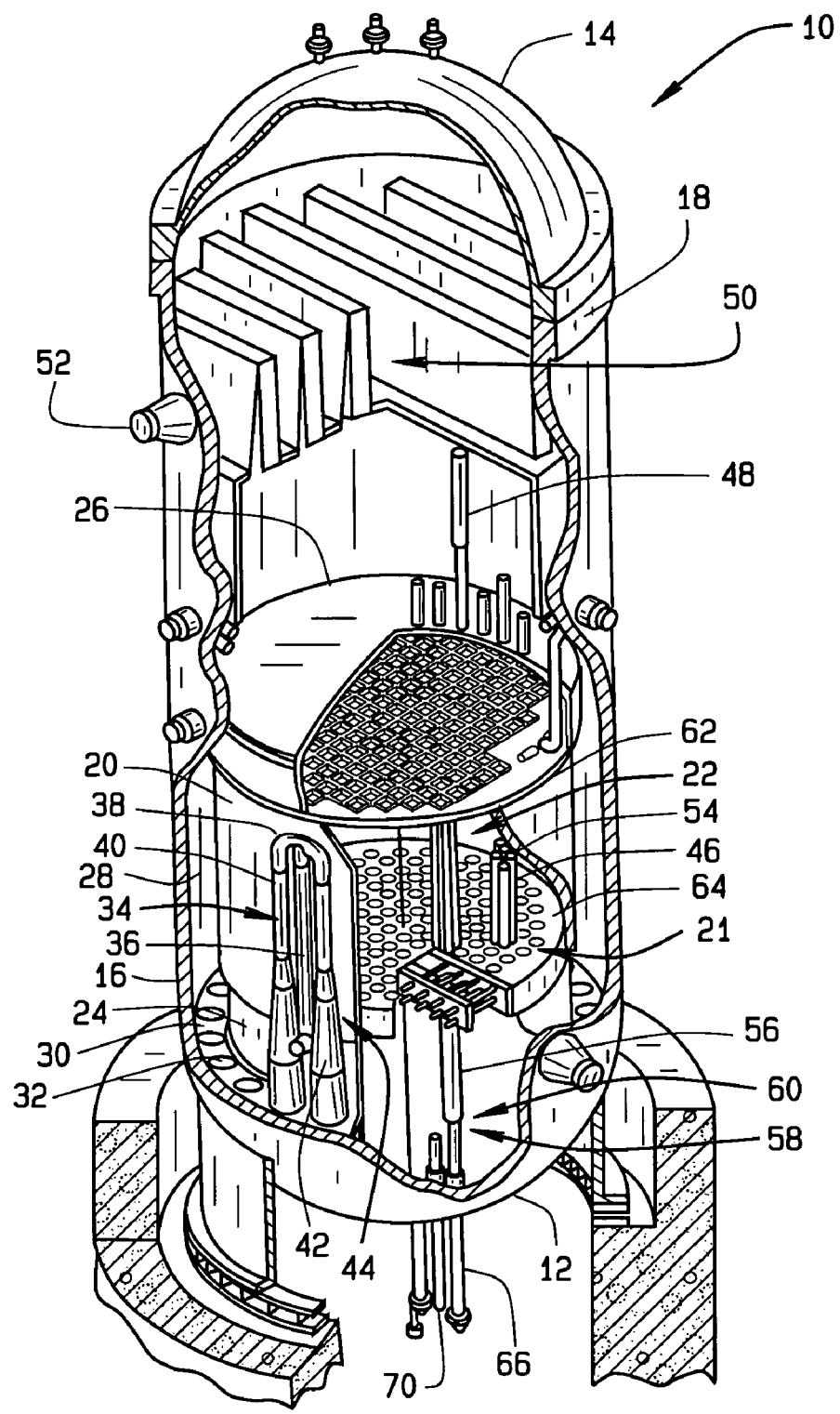
FIG. 1 is a sectional view, with parts cut away, of a boiling water nuclear reactor pressure vessel (RPV).

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22 and a bypass water region, called a reflector 21. Shroud 20 is supported at one end by a shroud support 24 and includes an opposed removable shroud head 26. A downcorner region 28 is an annulus formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes a plurality of fuel bundles 46 of fissionable material. Water circulated up through core 22 is at least partially converted to steam. A plurality of steam separators 48 separate steam from water, which is recirculated. A plurality of steam dryers 50 remove residual water from the steam. The steam exits the RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted adjacent fuel bundle 46, it absorbs neutrons that would otherwise be available to promote the chain reaction which generates heat in core 22.

Each control rod 54 couples through a control rod drive tube 56 with a control rod drive mechanism (CRDM) 58 to form a control rod apparatus 60. CRDM 58 moves control rod 54 relative to a core support plate 64 and adjacent fuel bundles 46. CRDM 58 extends through bottom head 12 and is enclosed in a control rod drive mechanism housing 66. A control rod guide tube 56 extends vertically from the control rod drive mechanism housing 66 to core support plate 64. Control rod guide tubes 56 restrict non-vertical motion of control rods 54 during control rod 54 insertion and withdrawal. Control rod guide tubes 56 can have any number of shapes, for example a cruciform shape, a cylindrical shape, a rectangular shape, a Y-shape, and any other suitable polygonal shape.

Figure 2:
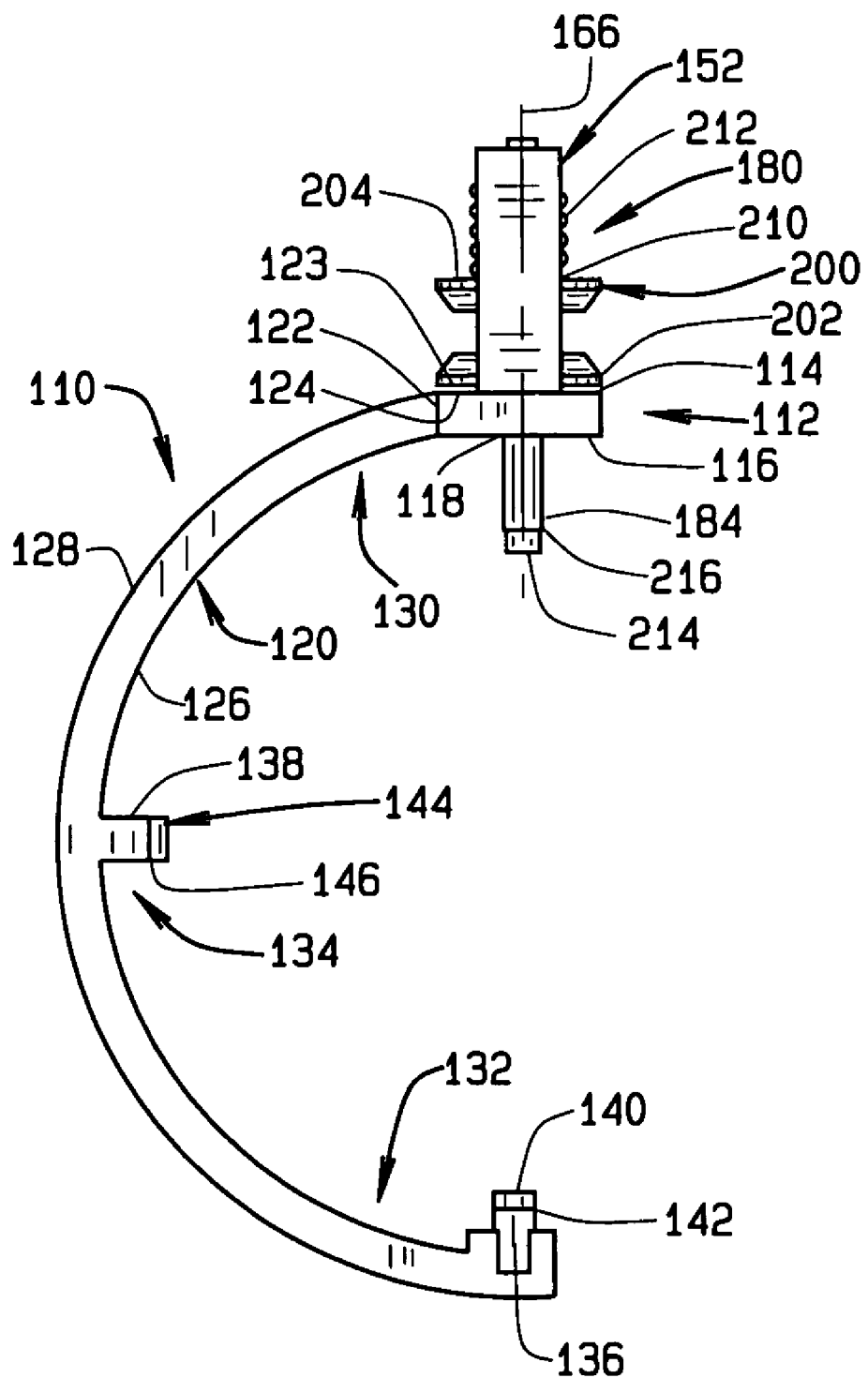
FIG. 2 is a side elevation view of a seal clamp.
Figure 3:
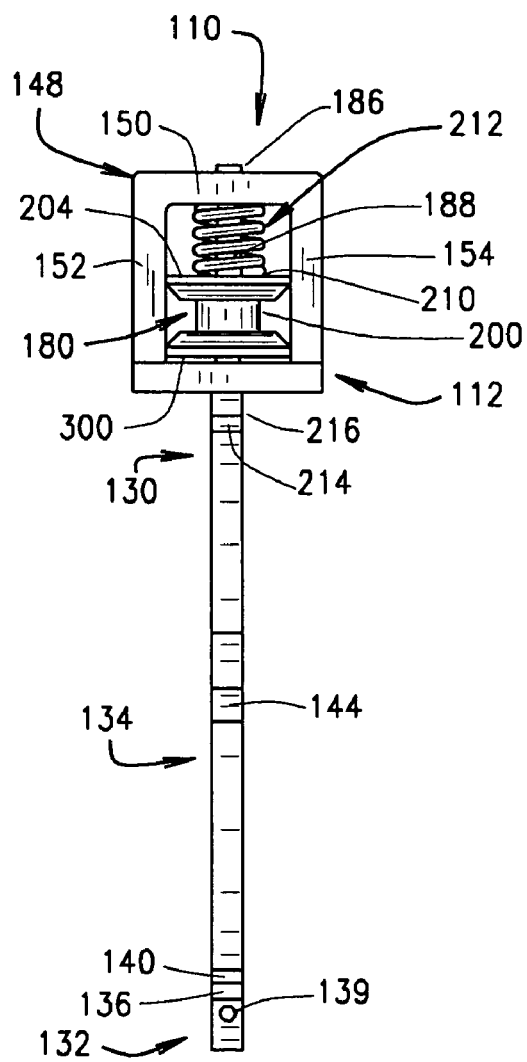
FIG. 3 is a side elevation view of seal clamp rotated 90 degrees from the view in FIG. 2.
Figure 4:
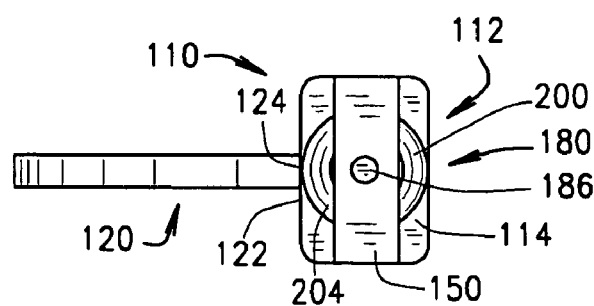
FIG. 4 is a plan view of seal clamp 10.
Figure 5:
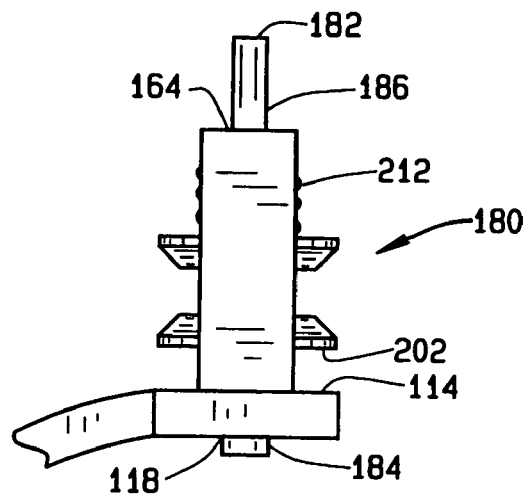
FIG. 5 is a detail view of a seal clamp in a retracted position.
Figure 6:
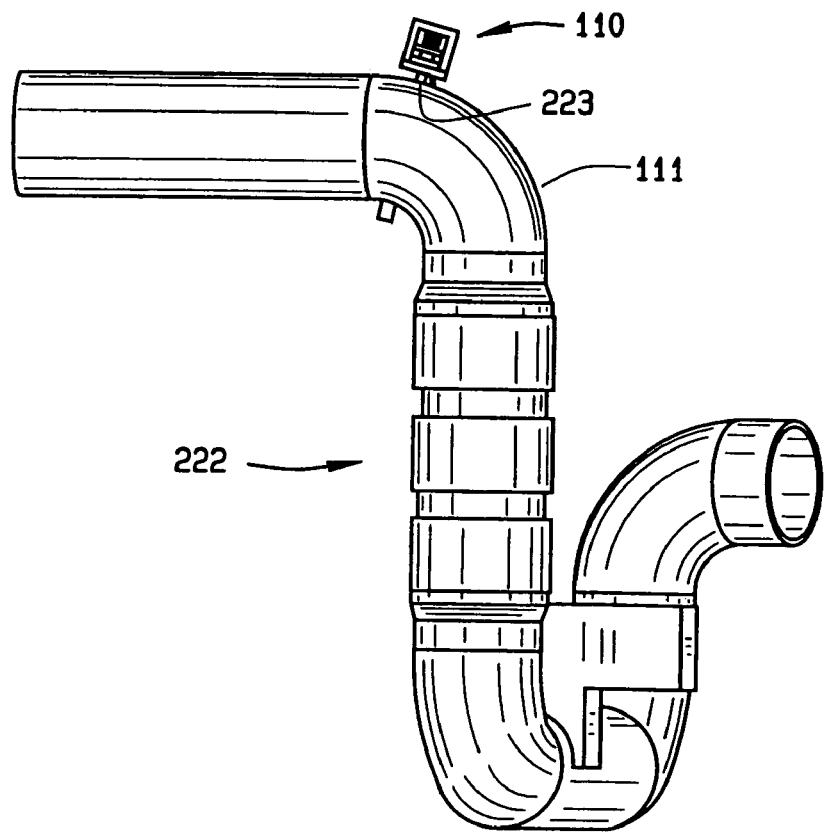
FIG. 6 is a diagram of a seal clamp installed on a pipe.

FIG. 2 shows, in an exemplary embodiment, a side elevation view of a seal clamp assembly 110. FIG. 3 shows a side elevation view of seal clamp 110 rotated 90 degrees from the view in FIG. 2. FIG. 4 shows a plan view of seal clamp 10. FIG. 5 shows a detail view of a seal clamp 110 in a retracted position, and FIG. 6 shows seal clamp 110 installed on pipe elbow 111.

Referring to FIGS. 2, 3, 4, 5 and 6, in an exemplary embodiment, seal clamp assembly 110 includes a base 112 having a first side 114, a second side 116 and an aperture 118 which extends through base 112 from first side 114 to second side 116. A plurality of sidewalls extend between base first side 114 and base second side 116. Aperture 118 is approximately centered in first side 114. A semi-circular brace 120 is coupled to a base first sidewall 122 by an axial end 123 of semi-circular base 124. Brace 120 includes an inner circumferential side 126, an outer circumferential side 128, a base end 130, a distal end 132, and a middle portion 134. A distal pad 136 is hingedly coupled to distal end 132 of brace 120 and a middle pad 138 is fixedly attached to inner circumferential side 126 of brace 120 approximately midway between base 112 and distal pad 136. A hinge pin 139 couples distal pad 136 to brace distal end 132. A resilient material 140 is coupled to distal pad first face 142, which is disposed away from brace inner circumferential side 126. A resilient material 144 is coupled to middle pad first face 146, which is disposed away from brace inner circumferential side 126.

A spring bridge 148 is fixedly coupled to base first side 114. Spring bridge 148 includes a middle portion 150, a first side portion 152 and a second side portion 154, configured to form a substantially rectangular U-shaped structure. An aperture 164 extends through spring bridge middle portion 150 in an axis of symmetry 166, such that spring bridge aperture 164 is in substantial lineal alignment with base aperture 118.

A clamping assembly 180 includes a shaft 182 that has a first end portion 184, a second end portion 186 and a middle portion 188. Shaft first end portion 184 extends through base aperture 118 and shaft second end portion 186 extends through spring bridge aperture 164. A collar 200 is positioned between base first side 114 and spring bridge middle portion 150 circumscribing and fixedly attached to shaft 182 such that a collar first axial face 202 contacts base first side 114. A spring 212 is positioned between collar 200 and spring bridge middle portion 150 circumscribing shaft 182. A seal 214 is coupled to a shaft first end face 216.

FIG. 6 shows seal clamp 110 installed on a pipe elbow 111 of a piping system 222. In one embodiment, seal clamp 110 is coupled to a pipe in a nuclear reactor piping system. In another embodiment seal clamp 110 is coupled to a High Pressure Core Flooder pipe.

In operation, seal clamp clamping assembly 180 is movable between a first extended position (shown in FIG. 2) and a second retracted position (shown in FIG. 5). In the extended position, clamping assembly 180 is biased by spring 212 such that collar first axial face 202 contacts base first side 114. Base first side 114 stops the travel of clamping assembly 180 when seal clamp 110 is not engaged to a pipe (not shown). When seal clamp 110 is engaged to a pipe, seal 214 is in contact with the pipe and stops travel of clamping assembly 180 and collar first axial face 202 will not contact base first side 114. In the extended position, shaft first end portion 184 extends through base aperture 118 farther than shaft second end portion 186 extends through spring bridge aperture 164. Referring now to FIG. 5, in the retracted position, spring 212 is compressed such that collar first axial face 202 does not contact base first side 114. In the retracted position, shaft first end portion 184 extends through base aperture 118 less than shaft second end portion 186 extends through spring bridge aperture 164. By looking at shaft first end portion 184 and shaft second end portion 186 and comparing a relative distance each extends past their respective apertures, the state of clamping assembly extension is determined. Seal clamp 110 is installed on pipe 222 by placing seal clamp 110 in the retracted position and positioning seal clamp 110 such that seal 214 is located above vent 223 and middle pad 138 and lower pad 136 are contacting pipe 222. Seal clamp 110 is placed in the extended position such that seal 214 covers vent 223 and middle pad 138 and lower pad 136 remain in contact with pipe 222

The exemplary embodiment shows the clamping assembly biased by a spring but, a number of different biasing elements are contemplated, including but not limited to, a fluid powered single or double acting actuator.

Figure 7:
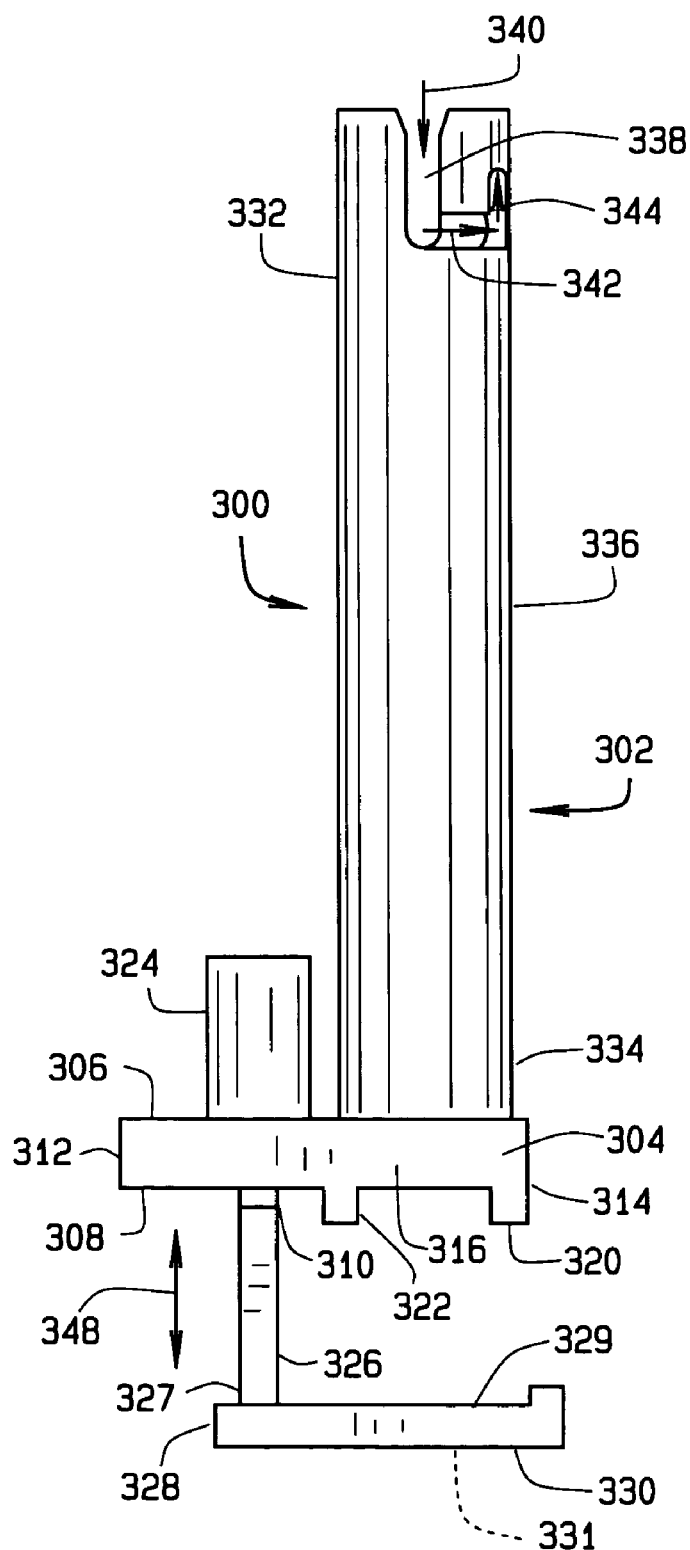
FIG. 7 is a side elevation view of a seal clamp installation tool.
Figure 8:
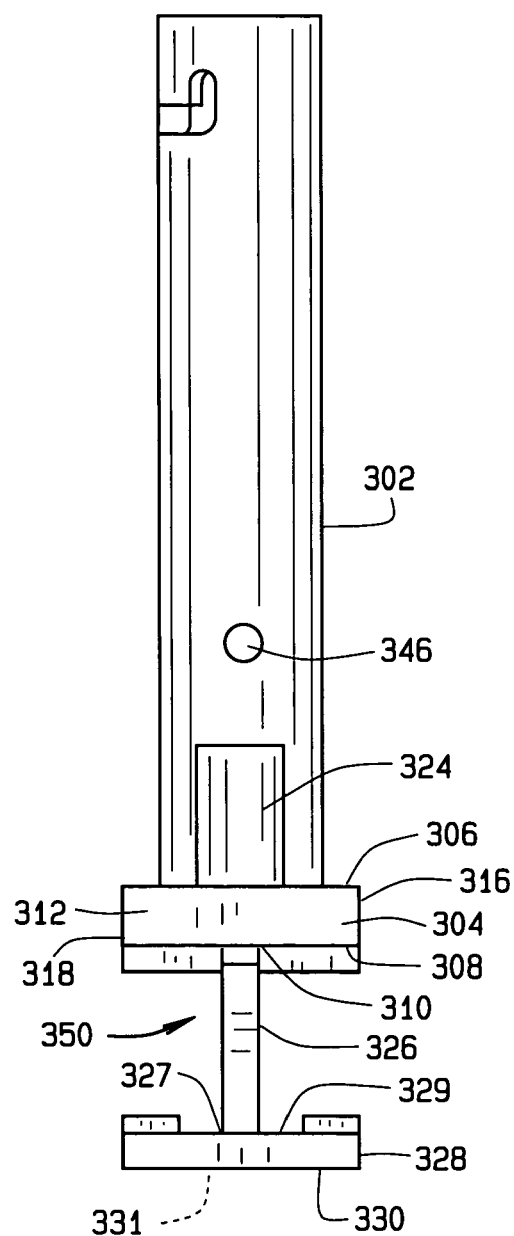
FIG. 8 is a side elevation view of the seal clamp installation tool rotated 90 degrees from the view in FIG. 7.
Figure 9:
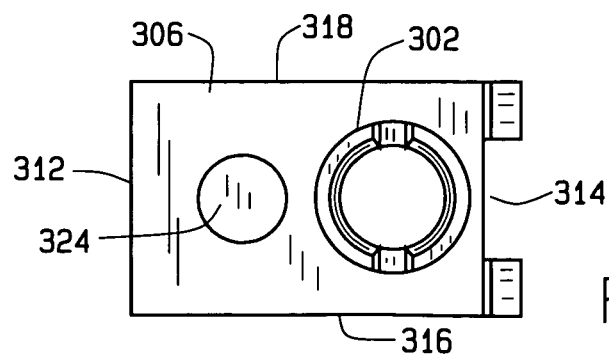
FIG. 9 is a plan view of the seal clamp installation tool.

FIG. 7 shows a side elevation view of a seal clamp installation tool 300, FIG. 8 shows a side elevation view of seal clamp installation tool 300 rotated 90 degrees from the view in FIG. 7, and FIG. 9 shows a plan view of seal clamp installation tool 300. Seal clamp installation tool 300 is used for remotely attaching a seal clamp 110 to a pipe 111. Referring to FIGS. 7, 8, and 9, tool 300 includes, in an exemplary embodiment, a pole adapter 302 for attaching seal clamp installation tool 300 to a tool manipulator, for example, an extension pole, ropes, or a motorized tool manipulator (not shown). Pole adapter 302 extends perpendicularly from and is fixedly attached to a first plate 304 having opposing faces 306 and 308. An aperture 310 extends through first plate 304 from face 306 to face 308. A plurality of sidewalls 312, 314, 316, and 318 extend between face 206 and face 308. Sidewall 312 is substantially parallel to and opposite sidewall 314, and perpendicular and adjacent to sidewalls 316 and 318. A first ridge 320 extends perpendicularly from second face 308 parallel to and adjacent to sidewall 314. A second ridge 322 extends perpendicularly from second face 308 parallel to first ridge 320 and is disposed between first ridge 320 and aperture 310.

A cylinder actuator 324 includes a cylinder shaft 326 that movably extends from cylinder actuator 324 perpendicularly through first plate aperture 310 and has a distal end 327. Cylinder actuator 324 is replacably attached to first plate face 306. A second plate 328 has a substantially rectangular-shaped perimeter and includes a opposing faces 329 and 330. Second plate 328 is fixedly attached to distal end 327 of cylinder shaft 326 and also includes a U-shaped aperture 331 extending through second plate 328 from face 329 to face 330. Aperture 331 is configured to operatively engage collar 200 on seal clamp 110. In one embodiment, cylinder actuator 324 is a pneumatic cylinder actuator of a single-acting spring return type. In another embodiment, cylinder actuator 324 is a pneumatic cylinder actuator of a double-acting type.

Pole adapter 302 includes a first end portion 332, a second end portion 334, and a tubular body 336 that extends between first end 332 and second end 334. First end portion 332 includes a plurality of J-shaped channels 338, each of the channels configured to receive a tab (not shown) in a first axial direction 340, then in a second circumferential direction 342, then in a third axial direction 344 opposite first axial direction 340 for locking the tab into pole adapter 302. Aperture 346 extends radially through pole adapter body 336 for draining liquid from the interior of pole adapter body 336.

Figure 10:
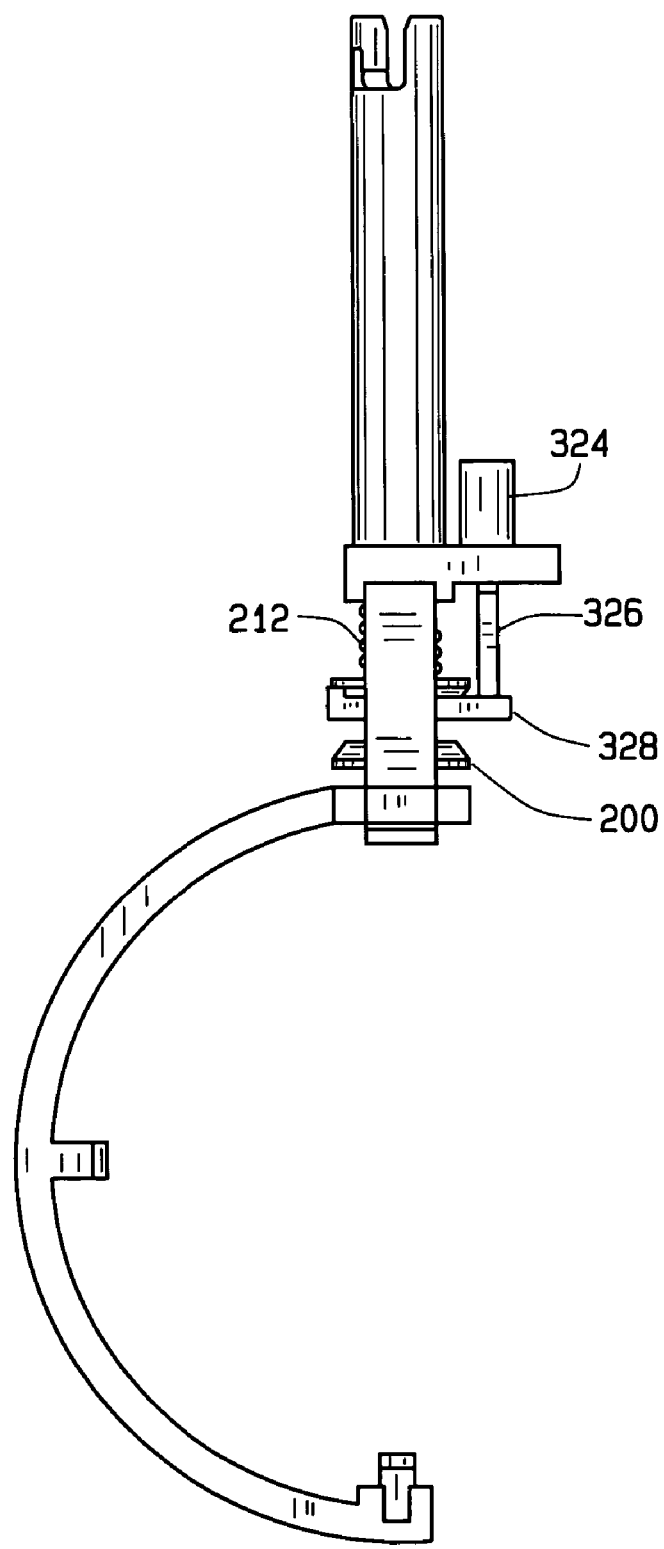
FIG. 10 is a side elevation view of the seal clamp installation tool and the seal clamp.
Figure 11:
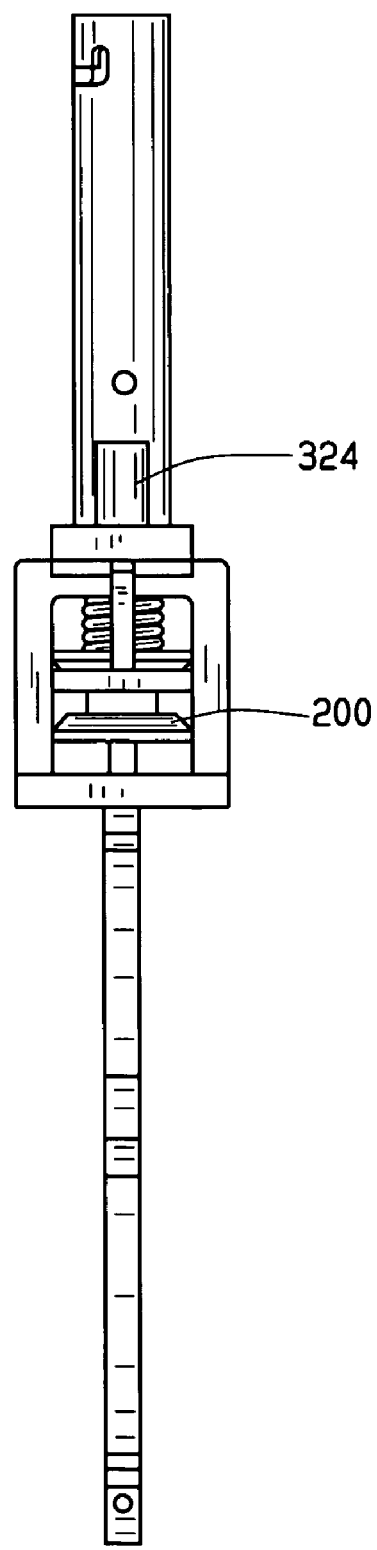
FIG. 11 is a side elevation view of the seal clamp installation tool and the seal clamp rotated 90 degrees from the view in FIG. 10.

FIG. 10 shows a side elevation view of a seal clamp installation tool 300 and seal clamp 110. FIG. 11 shows a side elevation view of a seal clamp installation tool 300 and seal clamp 110 rotated 90 degrees from the view in FIG. 10.

In operation, cylinder actuator shaft 326 is moves in an axial direction 348 between a first retracted position (not shown) and a second extended position 350. Shaft 326 is able to be stopped in mid-stroke to reverse direction or to hold in a mid-position. The mid-position being between the retracted position and second extended position 350. When seal clamp installation tool 300 is used in conjunction with seal clamp 110 (Shown in FIGS. 2-6), placing seal clamp installation tool 300 into the retracted position places seal clamp 110 into a disengaged position and placing seal clamp installation tool 300 into extended position 350 places seal clamp 110 into an engaged position. To engage tool 300 to seal clamp 110, tool 300 is placed in extended position 350, U-shaped aperture 331 of second plate 328 is positioned such that collar 200 extends through aperture 331. Tool 300 is placed in the retracted position, second plate 328 engages collar 100 to compress spring 112 and move seal clamp 110 to a disengaged position.

Figure 12:
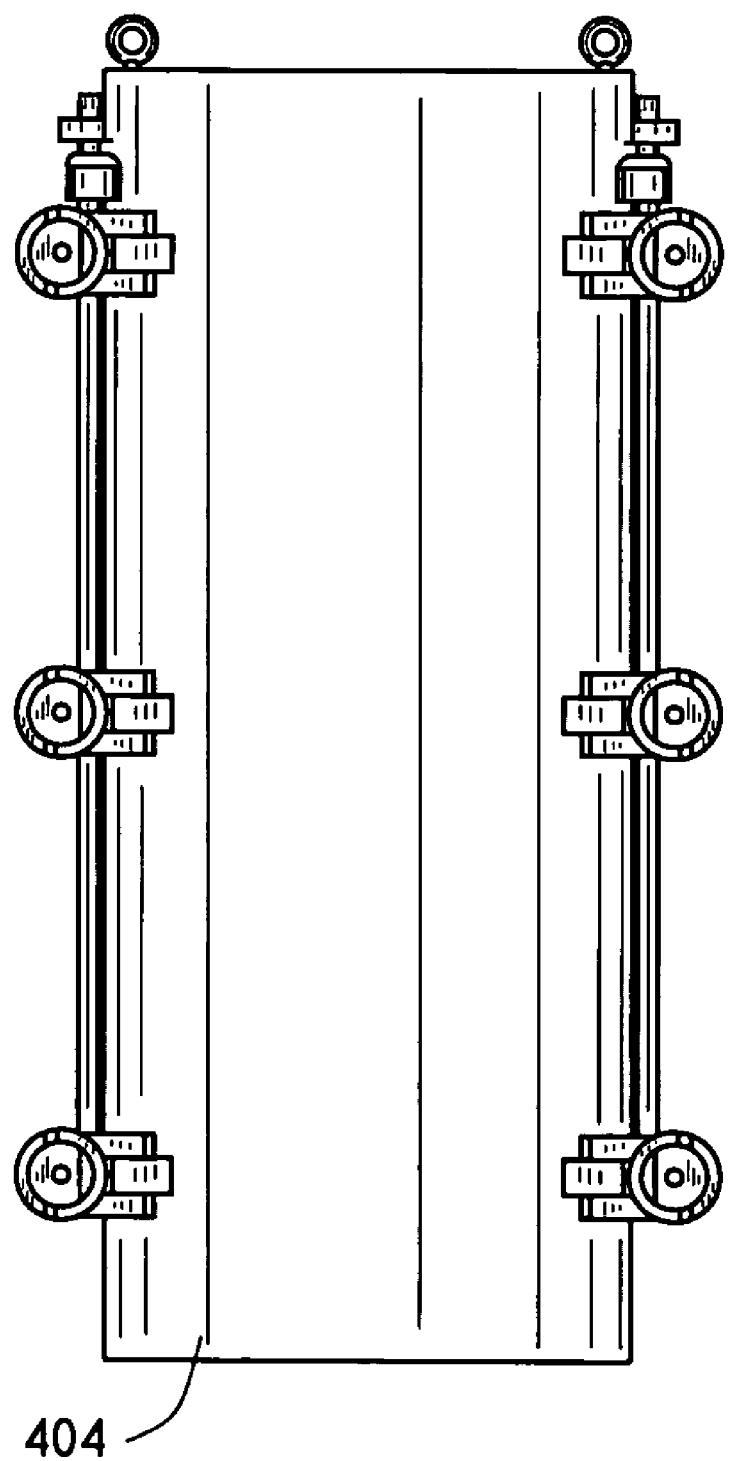
FIG. 12 is a side elevation view of a seal clamp assembly.
Figure 13:
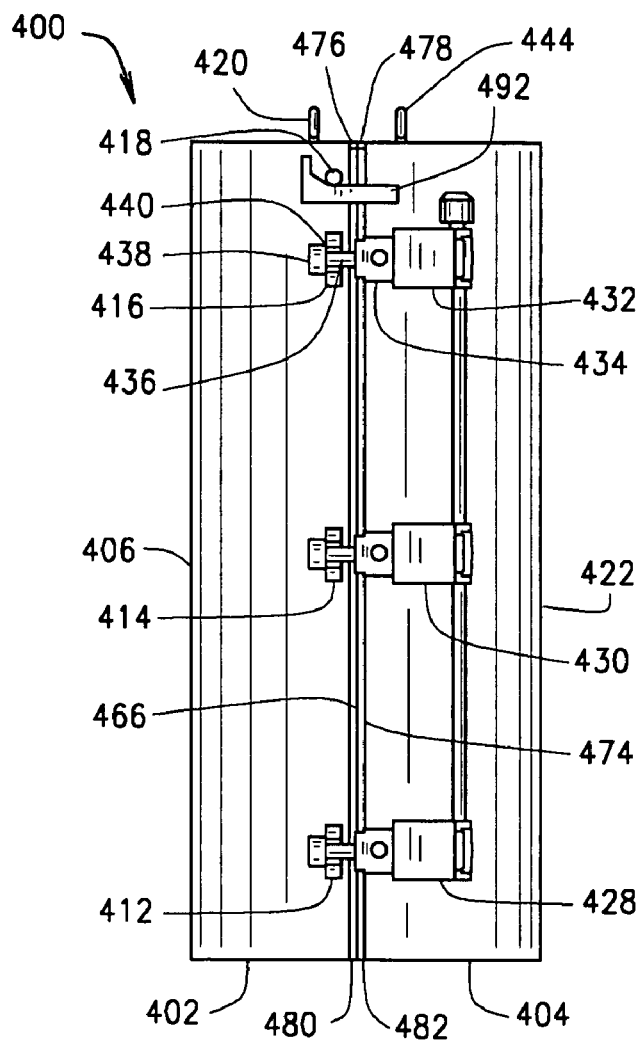
FIG. 13 is a side elevation view of the seal clamp assembly rotated 90 degrees from the view in FIG. 12.
Figure 14:
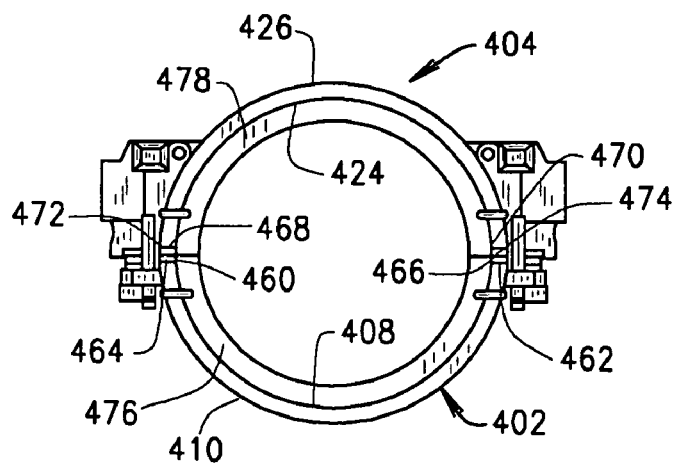
FIG. 14 is a plan view of the seal clamp assembly.

FIG. 12 shows, in another embodiment, a side elevation view of a seal clamp assembly 400, FIG. 13 shows a side elevation view of seal clamp assembly 400 rotated 90 degrees from the view in FIG. 12, and FIG. 14 shows a plan view of a seal clamp assembly 400. Referring to FIGS. 12, 13 and 14, seal clamp assembly 400 includes a seal clamp first half-shell 402 and a seal clamp second half-shell 404. First half-shell 402 includes a semi-cylindrical body with a concave interior surface 408, a convex exterior surface 410, a plurality of engagement tabs 412, 414, and 416. In other embodiments, any number of engagement tabs may be used. First half-shell 402 also includes an alignment pin 418, and an eyebolt 420.

Seal clamp second half-shell 404 includes a semi-cylindrical body 422 with a concave interior surface 424, a convex exterior surface 426, and actuating cylinders 428, 430, and 432. Actuating cylinders 428, 430, and 432 include a cylinder extension 434 that has a shaft 436 and an engagement disc 438 coupled to an axial face 440 of shaft 436. An alignment lance 442 is coupled to exterior surface 426, and is configured to engage alignment pin 418 when seal clamp assembly 400 is fully assembled. Second half-shell 404 also includes an eyebolt 444. In another embodiment, other rigging devices may be used as is known in the art in any number as is safe and convenient.

Both half-shells of clamp assembly 400 include seals which work together to substantially prevent fluid egress from an interior volume of a fully assembled seal clamp to a volume exterior to the fully assembled seal clamp. Half-shell 402 includes a plurality of longitudinal faces 460 and 462. A plurality of longitudinal seals 464 and 466 are coupled to longitudinal faces 460 and 462 respectively. Half-shell 404 includes a plurality of longitudinal faces 468 and 470. A plurality of longitudinal seals 472 and 474 are coupled to longitudinal faces 468 and 470 respectively. Circumferential seal first halves 476 and 478 and circumferential seal second halves 480 and 482 are coupled to interior surfaces 408 and 424 of half-shells 402 and 404 respectively. In operation, when seal clamp assembly 400 is fully assembled, seal 464 contacts seal 472 and seal 466 contacts seal 474.

Figure 15:
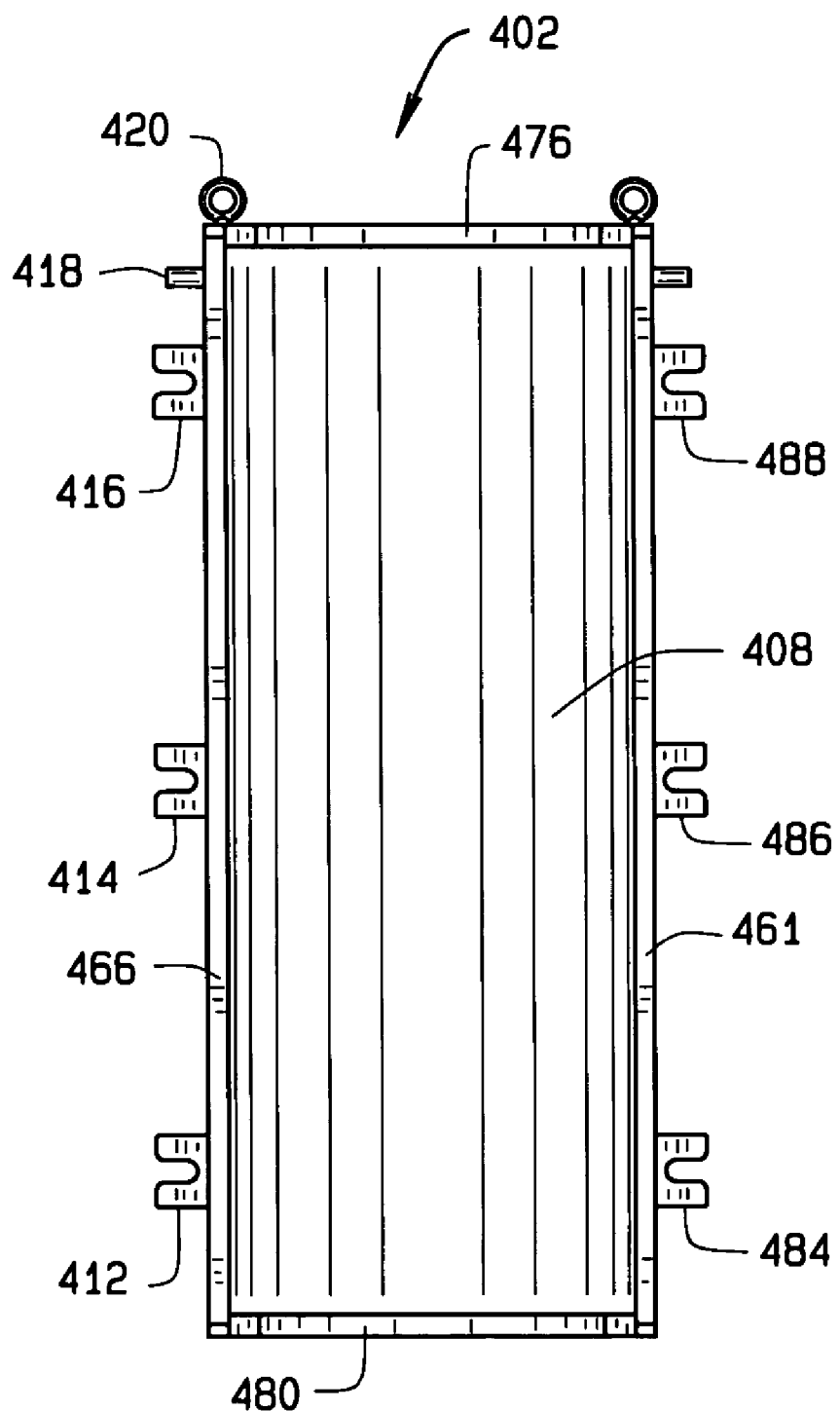
FIG. 15 is a side elevation view of a seal clamp first half-shell.
Figure 16:
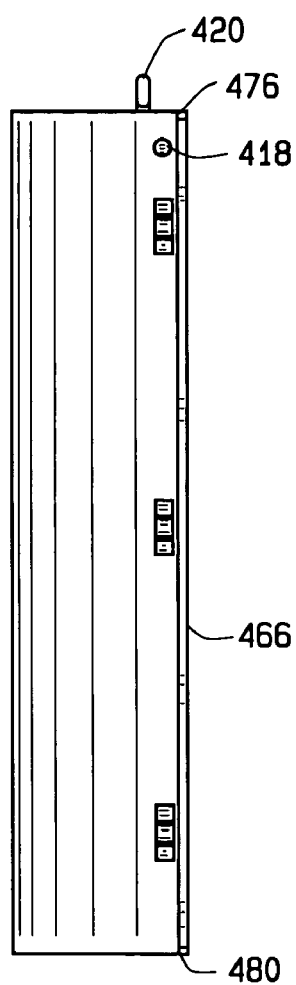
FIG. 16 is a side elevation view of the seal clamp first half-shell rotated 90 degrees from the view in FIG. 15.
Figure 17:
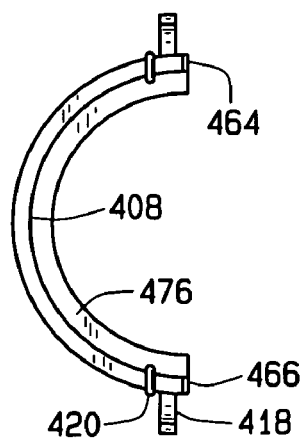
FIG. 17 is a plan view of the seal clamp first half-shell.

FIG. 15 shows a side elevation view of a seal clamp first half-shell 402, FIG. 16 shows a side elevation view of seal clamp first half-shell 402 rotated 90 degrees from the view in FIG. 15, and FIG. 17 shows a plan view of seal clamp first half-shell 402. Referring to FIGS. 15, 16 and 17, in the exemplary embodiment, seal clamp first half-shell 402 includes six engagement tabs 412, 414, 416, 484, 486 and 488. Each tab includes a U-shaped notch sized to receive actuating cylinder shaft 436. Circumferential seals 476 and 480 are coupled to interior surface 408.

Figure 18:
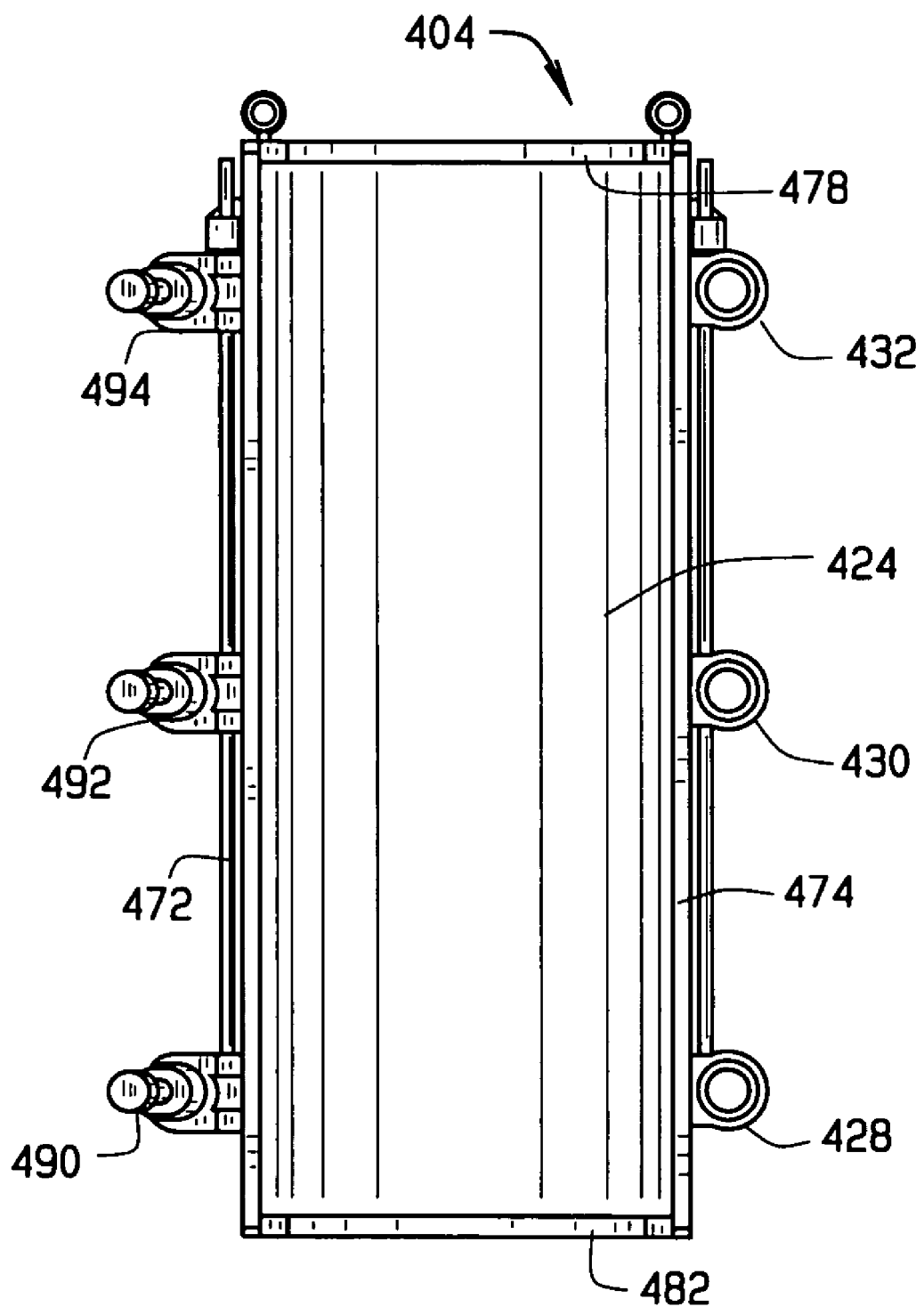
FIG. 18 is a side elevation view of a seal clamp second half-shell.
Figure 19:
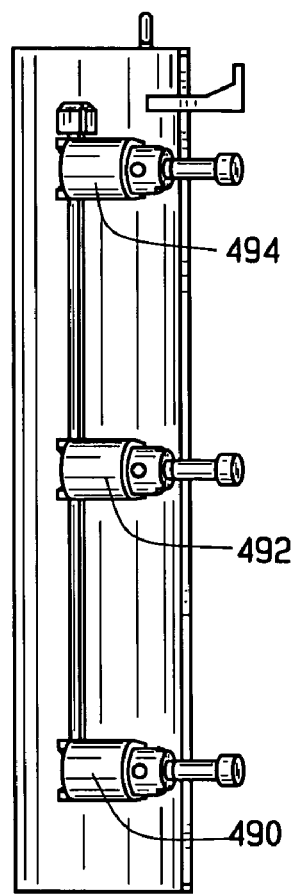
FIG. 19 is a side elevation view of the seal clamp second half-shell rotated 90 degrees from the view in FIG. 18.
Figure 20:
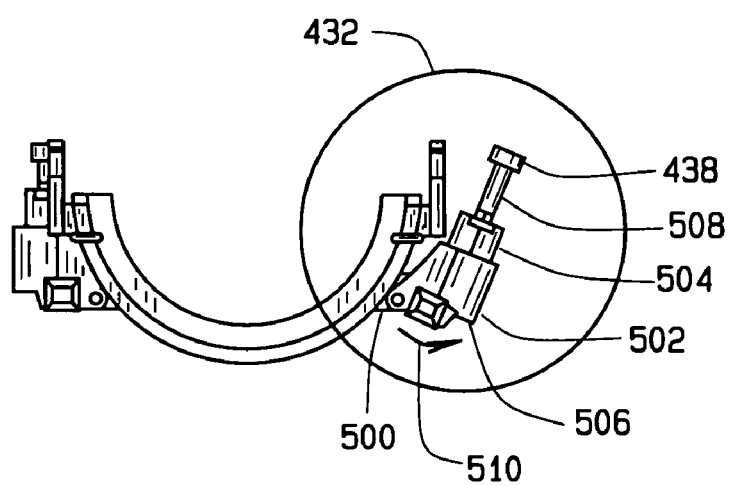
FIG. 20 is a detail plan view of the actuating cylinder.

FIG. 18 shows a side elevation view of a seal clamp second half-shell 404, FIG. 19 shows a side elevation view of a seal clamp second half-shell 404 rotated 90 degrees from the view in FIG. 18, and FIG. 20 shows a detail plan view of actuating cylinder 432. Referring to FIGS. 18, 19 and 20, seal clamp second half-shell 404 includes actuating cylinders 428, 430, 432, 490, 492 and 494, a pivoting cylinder mounting tab 500, a pivoting cylinder housing 502 pivotably coupled to mounting tab 500, a hydraulic spring cylinder 504 removably coupled to pivoting cylinder housing 502, and a cylinder rotation rod 506 fixedly attached to pivoting cylinder housing 502. Actuating cylinder 432 is configured to be in substantial alignment with seal clamp first half-shell cylinder notch 416 when seal clamp assembly is fully assembled. Pivoting cylinder housing 502 is rotatable between a first engaged position (shown in FIG. 13) and a second disengaged position (shown in FIG. 20).

Figure 21:
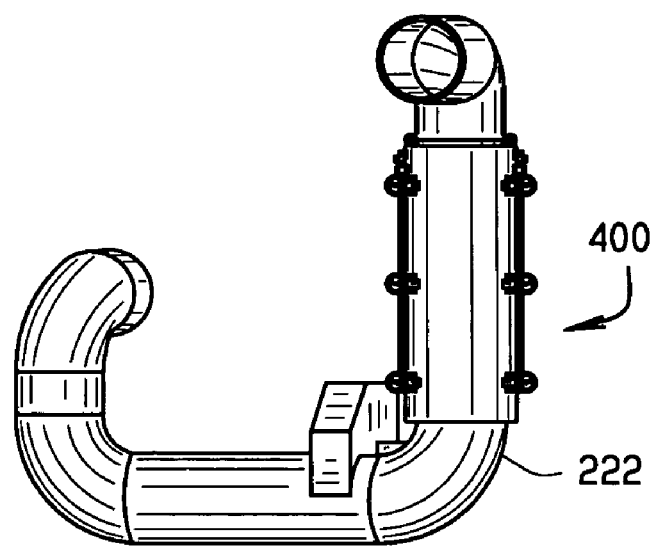
FIG. 21 is isometric diagram of the seal clamp assembly installed on a pipe.
Figure 22:
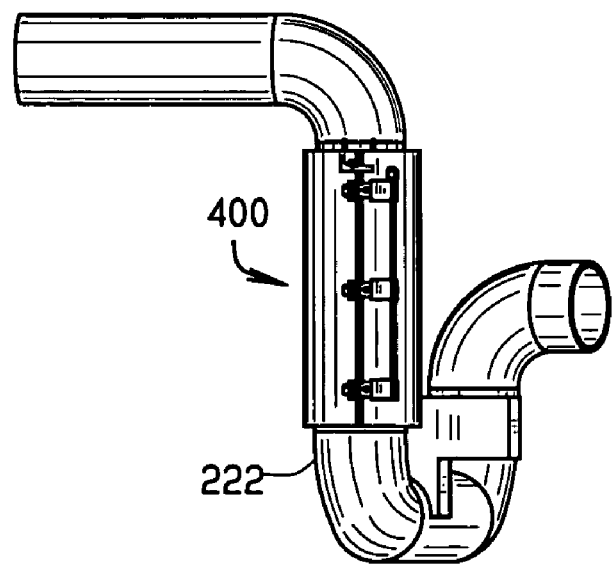
FIG. 22 is isometric diagram of the seal clamp assembly installed on a pipe rotated 90 degrees from the view in FIG. 21.

FIGS. 21 and 22 show seal clamp assembly 400 installed on a pipe 222. Referring to FIGS. 18, 19, 20, 21, and 22, in operation, when pivoting cylinder housing 502 is in the engaged position, a cylinder extension 508 is aligned with clamp engagement tab 416. Pivoting cylinder housing 502 is placed in the engaged position by rotating cylinder rotation rod 506 in a counterclockwise direction 510 from a disengaged position (shown in FIG. 20) to an engaged position (shown in FIG. 14). When pivoting cylinder housing 502 is in the disengaged position, pivoting cylinder housing 502 is rotated laterally away from seal clamp second half-shell exterior surface 426 such that cylinder extension 508 is not aligned with tab 416.

Hydraulic spring cylinder 504 is operable between an extended position (shown in FIG. 20) and a retracted position (shown in FIG. 14). When hydraulic spring cylinder 504 is in the retracted position, engagement disc 438 engages tab 416 drawing the seal clamp assembly half-shells 402 and 404 together at their respective longitudinal seals 464, 466, 472, and 474, compressing them. Circumferential seals 476, 478, 480 and 482 are compressed between half shell interior surfaces 408 and 424 and pipe 222 (shown in FIGS. 21 and 22). The seals circumscribe the joints between the clamp assembly half shells 402 and 404 and pipe 222 forming a substantially leak tight boundary.

The above described seal clamp assembly for isolating reactor equipment from sources of reactor water during shutdown maintenance periods is reliable and easily installed. Less maintenance and man-hours are expended isolating reactor piping systems using non-standard piping system lineups, and as such a cost-effective and reliable clamp is provided.

While the invention has been described in terms of various specific embodiments, those skilled in the art will recognize that the invention can be practiced with modification within the spirit and scope of the claims.

What is claimed is:

1. A seal clamp assembly for sealing an opening in a piping system, said seal clamp comprising:
   a base comprising a first side, a second side and an aperture extending therethrough from said first side to said second side;
   a brace coupled to said base, said brace comprising a distal pad hingedly coupled to a distal end portion of said brace;
   a spring bridge coupled to said base first side, said bridge comprising a substantially rectangular U-shaped frame and an aperture extending through said spring bridge frame such that said spring bridge aperture is in substantial lineal alignment with said base aperture; and
   a clamping assembly coupled to a proximate end portion of said brace.

2. A seal clamp assembly in accordance with claim 1 wherein said clamping assembly comprises:
   a shaft comprising a first end and a second end, said shaft first end extending through said base aperture and said shaft second end extending through said spring bridge aperture;
   a collar circumscribing and fixedly attached to said shaft, said collar positioned between said base first side and said spring bridge frame such that a first axial face of said collar contacts said base; and
   a spring circumscribing said shaft and positioned between said collar and said spring bridge.

3. A seal clamp assembly in accordance with claim 2 wherein said clamping assembly comprises a first extended position wherein said clamping assembly is biased by said spring such that said collar first axial face contacts said base, said shaft first end extends through said base aperture by a first distance, and said shaft second end extends through said spring bridge aperture by a second distance, said first distance being greater than said second distance.

4. A seal clamp assembly in accordance with claim 3 wherein said clamping assembly comprises a second retracted position wherein said shaft first end extends through said base aperture by a first distance and said shaft second end extends through said spring bridge aperture by a second distance, said first distance being less than said second distance.

5. A seal clamp assembly in accordance with claim 1 wherein said brace further comprises a middle pad fixedly attached to an inner circumference of said brace between said base and said distal pad.

6. A seal clamp assembly in accordance with claim 5 wherein said middle pad is fixedly attached to an inner circumference of said brace approximately midway between said base and said distal pad.

7. A seal clamp assembly in accordance with claim 1 wherein said brace further comprises an arcuate shape.

8. A seal clamp assembly for sealing an opening in a piping system, said seal clamp comprising:
   a base comprising a first side, a second side and an aperture extending therethrough from said first side to said second side;
   a brace coupled to said base, said brace comprising a distal pad hingedly coupled to a distal end portion of said brace;
   a spring bridge coupled to said base first side, said bridge comprising a substantially rectangular U-shaped frame, an aperture extending through said spring bridge frame such that said spring bridge aperture is in substantial lineal alignment with said base aperture;

a shaft comprising a first end and a second end, said shaft first end extending through said base aperture and said shaft second end extending through said spring bridge aperture; and a clamping assembly coupled to a proximate end portion of said brace.

9. A seal clamp assembly in accordance with claim 8 wherein said clamping assembly comprises:

a collar circumscribing and fixedly attached to said shaft, said collar positioned between said base first side and said spring bridge frame such that a first axial face of said collar contacts said base; and a spring circumscribing said shaft and positioned between said collar and said spring bridge.

10. A seal clamp assembly in accordance with claim 9 wherein said clamping assembly comprises a first extended position wherein said clamping assembly is biased by said spring such that said collar first axial face contacts said base, said shaft first end extends through said base aperture by a first distance, and said shaft second end extends through said spring bridge aperture by a second distance, said first distance being greater than said second distance.

11. A seal clamp assembly in accordance with claim 10 wherein said clamping assembly comprises a second retracted position wherein said shaft first end extends through said base aperture by a first distance and said shaft second end extends through said spring bridge aperture by a second distance, said first distance being less than said second distance.

12. A seal clamp assembly in accordance with claim 8 wherein said brace further comprises a middle pad fixedly attached to an inner circumference of said brace between said base and said distal pad.

13. A seal clamp assembly in accordance with claim 12 wherein said middle pad is fixedly attached to an inner circumference of said brace approximately midway between said base and said distal pad.

14. A seal clamp assembly in accordance with claim 8 wherein said brace further comprises an arcuate shape.

* * * * *